United States Patent
Horeth et al.

(10) Patent No.: US 9,527,229 B2
(45) Date of Patent: Dec. 27, 2016

(54) METHOD AND DEVICE FOR PRODUCING MOLDED TRIM PARTS

(75) Inventors: Dieter Horeth, Wendlingen (DE); Wolfgang Horeth, Koengen (DE)

(73) Assignee: HORETH KUNSTSTOFFVERARBEITUNG GMBH, Wendlingen (DE)

( * ) Notice: Subject to any disclaimer, the term of this patent is extended or adjusted under 35 U.S.C. 154(b) by 1235 days.

(21) Appl. No.: 13/511,611

(22) PCT Filed: Nov. 23, 2010

(86) PCT No.: PCT/EP2010/068029
§ 371 (c)(1),
(2), (4) Date: May 23, 2012

(87) PCT Pub. No.: WO2011/061346
PCT Pub. Date: May 26, 2011

(65) Prior Publication Data
US 2012/0286447 A1 Nov. 15, 2012

(30) Foreign Application Priority Data

Nov. 23, 2009 (DE) .......................... 10 2009 055 983

(51) Int. Cl.
*B29C 45/16* (2006.01)
*B29C 45/14* (2006.01)
(Continued)

(52) U.S. Cl.
CPC ........... *B29C 45/1418* (2013.01); *B29C 43/02* (2013.01); *B29C 45/162* (2013.01);
(Continued)

(58) Field of Classification Search
CPC .............. B29C 43/04; B29C 2043/142; B29C 2043/143; B29C 2043/144; B29C 2043/046; B29C 45/1418; B29C 45/162; B29C 45/1601; B29C 45/1615; B29C 45/16; B29C 45/1642; B29C 45/1643; B29C 2045/1623; B29C 2045/1651; B29C 69/02
(Continued)

(56) References Cited

U.S. PATENT DOCUMENTS 6,887,413 B1 5/2005 Schumacher
2007/0172664 A1 7/2007 Peng et al.

FOREIGN PATENT DOCUMENTS

CN 1799870 A 7/2006
DE 19949263 4/2001
(Continued)

OTHER PUBLICATIONS

First Office Action received in Chinese Patent Application No. 201080053050.6, mailed Feb. 21, 2014.
(Continued)

*Primary Examiner* — Timothy Kennedy
(74) *Attorney, Agent, or Firm* — Michael Best & Friedrich LLP

(57) ABSTRACT

The invention relates to a method for producing molded trim parts, wherein the following steps are carried out consecutively: compression molding a decorative blank having a visible side and a backing side as the first work piece; subsequent backmolding the first work piece and finally overmolding the first work piece. In the same step, a further decorative blank is compression-molded as the second work piece, and then the method is further carried out for the second work piece in the same way as for the first work piece. The invention further relates to a device for producing molded trim parts.

9 Claims, 7 Drawing Sheets

(51) Int. Cl.
*B29C 43/02* (2006.01)
*B29C 45/04* (2006.01)
*B29L 31/28* (2006.01)
*B29L 31/30* (2006.01)

(52) U.S. Cl.
CPC ...... *B29C 45/1671* (2013.01); *B29C 45/0408* (2013.01); *B29L 2031/286* (2013.01); *B29L 2031/3005* (2013.01)

(58) Field of Classification Search
USPC ........ 264/294, 296, 250, 254, 255; 425/130, 425/110, 111, 112, 127, 129.1
See application file for complete search history.

(56) References Cited

FOREIGN PATENT DOCUMENTS

| | | |
|---|---|---|
| DE | 10034518 | 8/2001 |
| DE | 10139839 | 3/2003 |
| DE | 102006026063 | 12/2007 |
| DE | 102007036660 | 2/2009 |
| DE | 60320134 | 5/2009 |
| EP | 0272535 A2 | 6/1988 |
| EP | 0607968 A1 | 7/1994 |
| EP | 0914921 A1 | 5/1999 |
| EP | 1219401 | 7/2002 |
| EP | 1612024 | 1/2006 |
| EP | 1886787 | 2/2008 |
| EP | 2027982 | 2/2009 |
| JP | S50139851 A | 11/1975 |
| JP | H05253939 A | 10/1993 |
| JP | 9239775 | 9/1997 |
| JP | H11226998 A | 8/1999 |
| JP | 2000317980 A | 11/2000 |
| JP | 2001239545 A | 9/2001 |
| JP | 2002337183 | 11/2002 |
| JP | 2006027138 | 2/2006 |
| WO | 2004073951 A1 | 9/2004 |
| WO | 2008043640 | 4/2008 |
| WO | 2008046180 | 4/2008 |
| WO | WO 2010032688 A1 * | 3/2010 .......... B29C 45/162 |
| WO | 2011061346 | 3/2011 |

OTHER PUBLICATIONS

Notice of Reasons for Rejection received in Japanese Patent Application No. 2012-539361, mailed Feb. 25, 2014.
Burkle et al., Composite components with multi-processing equipment to produce economically, brochure, Kunststoffe (1991) 81(3):192-198.
PCT/EP2010/068029 International Preliminary Report on Patentability, International Search Report, and Written Opinion dated Dec. 9, 2011, 17 pages.

* cited by examiner

METHOD AND DEVICE FOR PRODUCING MOLDED TRIM PARTS

BACKGROUND OF THE INVENTION

The invention relates to a method and a device for producing molded trim parts. Such molded trim parts may be used, for example, for the interior lining of passenger compartments in a motor vehicle or for the visual design of domestic appliances. Such a molded trim part includes a layer of a decorative material (for example wood veneer, textile, leather), which enhances the visual appearance of the trim part. The decorative material is usually flexible and/or sensitive to mechanical damage. Therefore, to produce a molded trim part, the decorative material is usually back-molded on one side with a backing material (for example synthetic resin), which has the required mechanical stability. On the side facing away from the molded-on backing material, the decorative material is usually coated or over-molded with a protective material. The protective material is in this case usually transparent and forms surfaces of good visual quality (for example plastics from the group of polyurethanes (PUR) or polymethylmethacrylate (PMMA)). The molded trim parts concerned here are accordingly composite materials that usually have three layers (backing material, decorative material, protective material).

To produce molded trim parts, usually a blank is first preformed from a decorative material in a compression mold. After that, the preform is transferred into an injection-molding device and back-molded there with a backing material. In a next step, the workpiece is transferred into a second injection-molding device and overmolded there with a protective material. Finally, there then follows a trimming operation, in order to cut the molded trim part to a final size. In particular, this necessarily involves reworking the border of the workpiece that is held during the back-molding and overmolding operations. Such a method can be carried out on a production line in continuous operation and is therefore suitable for the mass production of molded trim parts. However, between the work steps, the respective intermediate product is changed over to a next tool. This has the disadvantage that sensitive surfaces may be damaged or the preformed parts may be distorted; the latter results if different method steps are carried out at greatly varying temperatures. This may negatively impact the quality and create dimensional inaccuracies.

EP 1 629 956 A1 describes a method and a device for producing trim parts such that, all the method steps (molding, overmolding, back-molding, cutting to size) are performed in one working device. This avoids losses in quality that are caused by intermediate products being changed over into different devices. However, the method is exclusively sequential, that is to say can only be carried out for one workpiece at a time. The working device is unavailable until a trim part is completely finished. This leads to unused waiting times during the respective method steps, which has adverse effects on the cost-effectiveness of the method.

SUMMARY OF THE INVENTION

In view of these disadvantages, one object of the invention is to produce high-quality, dimensionally accurate molded trim parts to be produced with high cost-effectiveness.

According to one embodiment of the invention, three steps are accordingly carried out repeatedly. Firstly, there is a compression molding of a decorative blank, having a visible side and a backing side, as a first workpiece in a compression mold. The compression mold includes a compression plunger and a first cavity plate. After the compression molding, the first workpiece is mold-bound in the first cavity plate. Subsequently, a back-molding of the first workpiece with a backing material on the backing side is performed in a back-molding mold, which includes the first cavity plate and an injection plunger. The first workpiece remains mold-bound on the injection plunger after the back-molding. Then, an overmolding of the first workpiece with a protective material on the visible side is performed in an overmolding mold, which includes the injection plunger and a second cavity plate.

According to another embodiment the invention, in the same method step as the overmolding, a further decorative blank as a second workpiece is compression-molded and mold-bound in the first cavity plate in a way corresponding to the first method step. Subsequently, the rest of the method is carried out for the second workpiece as it was for the first workpiece.

Throughout this disclosure, a cavity plate is to be understood as meaning half of a shaping or shape-working tool having two halves against which the decorative workpiece is pressed for shaping or in which the decorative workpiece is embedded. A cavity plate usually provides a mold cavity or a shaping impression. A plunger is the term used for that half of a shaping or shape-working tool by means of which the pressing or embedding of the decorative workpiece into the cavity plate is performed or by means of which the cavity plate is completed to form a shaping or shape-working tool.

The starting material for the method may be a layer of a decorative material that has not been shaped or cut to size. On the other hand, it is also conceivable to use already preformed and/or contour-cut decorative blanks.

Since, after the compression molding, the decorative blank is mold-bound in the first cavity plate, the preformed decorative blank is prevented from becoming distorted before the back-molding with the stabilizing backing material. In particular, the method conditions during the compression molding or back-molding can therefore be adjusted for optimum forming, for example, with temperature transitions or increased temperature during the compression molding, without allowance having to be made for the risk of distortion of the form (for example during cooling down).

Further, a change in the form during or after the method step for back-molding is avoided, since the workpiece remains mold-bound to the injection plunger. This effect of being bound to the mold is particularly advantageous because the backing material may undergo changes in volume during curing or cooling down or internal stresses of the material may build up.

Because the workpiece remains mold-bound throughout the working time—initially in the first cavity plate, then on the injection plunger, high dimensional accuracy and processing quality are achieved.

Since a further decorative blank can again be compression-molded in the first cavity plate in the same method step in which the first workpiece is overmolded, a continuous sequence of the method can be achieved. Each time this involves alternately overmolding one decorative blank and at the same time compression-molding another, and then back-molding the compression-molded decorative blank. In this case, after the method step for back-molding the first workpiece, the first cavity plate has become free in that said first workpiece has been mold-bound to the injection plunger. The waiting time during the overmolding is used for compression-molding a further decorative blank. The method step for back-molding can be used, for example, for ejecting a finished trim part and/or for supplying a further decorative blank to the device. As a result, the cost-effectiveness of the method can be increased. In particular, full automation of the continuous operation is possible for mass production.

The method according to the invention also has the advantage that it can be performed in a single device, which particularly comprises the first cavity plate and the injection plunger. Consequently, a changeover between different working devices is not required, whereby damage to the sensitive surfaces of the decorative blank before completion can be avoided. To this extent, the visual quality of the products can be improved with the method according to the invention.

The method described above is advantageously performed as a work method in a device which has a compression plunger and a first cavity plate, for pre-defining a compression mold, and also an injection plunger and a second cavity plate. In this case, the cavity plates can be moved in relation to the plungers in such a way that the device can be moved into an open position and a closed position. Furthermore, the cavity plates can be moved in relation to the plunger in such a way that the device can be moved into a compression position, in which the first cavity plate is assigned to the compression plunger and the second cavity plate is assigned to the injection plunger, and into a molding position, in which the first cavity plate is assigned to the injection plunger.

In this case, the open position of the device is distinguished by the fact that the cavity plates are kept at a distance from the plungers in such a way as to provide an intermediate space into which a decorative blank to be processed can be introduced. In the closed position, the compression plunger or injection plunger lies against the respective assigned cavity plate or engages in it.

For the method to be carried out continuously, this involves the device being moved essentially alternately into the open position and the closed position and, in parallel with that, alternately into the compression position and the molding position.

The two plungers and the cavity plates are arranged here in such a way that, in succession—in the closed position in each case—on the one hand the compression mold is provided for one workpiece and at the same time the overmolding mold is provided for another workpiece (compression position), on the other hand the back-molding mold is provided for an already compression-molded workpiece (molding position). After the back-molding, the first cavity plate again becomes free for receiving a further decorative blank, since the workpiece remains mold-bound to the injection plunger. As already explained above, continuous operation is made possible in this way.

In a preferred embodiment, the method includes a step for the compression molding of those portions of the first workpiece that protrude beyond the compression mold are pinched off. A reworking of the contours of the molded trim parts to a final size is therefore no longer required. In particular, there is no border at which the workpiece is held during the back-molding and/or overmolding, and which has to be reworked. Alternatively, it is also conceivable that the protruding portions are cut off.

The pinching off is distinguished here from a cutting off of the protruding portions. In particular, by contrast with cutting off, when pinching off no vertical flash face penetrates the material to separate the portions. Pinching off can achieve the effect on the one hand that the decorative material is compressed at the contour border and neat, high-quality transitions between the decorative material and the backing material or protective material are obtained on the finished molded trim part. On the other hand, pinching off along the contour is conducive to the workpiece being mold-bound in the first cavity plate.

Further, a bonding layer of a binding material or a bonding material, in particular an adhesive or reactive hotmelt adhesive, is applied to the backing side before the back-molding and/or to the visible side before the overmolding. As a result, the material bonding of the decorative material to the backing material and/or to the protective material can be achieved. This allows molded trim parts to be produced from decorative materials that do not enter into bonds with plastics, or only incompletely. The backing material and/or the protective material may, however, also be applied to the decorative material without such intermediate layers. This is assisted by optimum temperature conditions that are chosen for the injecting operations, without there being the risk of distortion of the workpiece since it is mold-bound throughout the entire method.

Advantageously, an increased temperature is provided in the method step for the compression molding in comparison with the method step for the back-molding and/or the overmolding. In particular, it is provided that the method step for the compression molding is performed at a temperature between 120° C. and 140° C.; the method step for the back-molding and/or the overmolding is performed at a temperature between 80° C. and 100° C. The increased temperature in the compression molding allows a durable and dimensionally accurate shaping to be achieved. In particular, the internal stresses occurring during the deforming of the decorative blank can be reduced. On the other hand, the temperatures in the method step for the back-molding and/or the overmolding may be chosen such that optimum bonding between the decorative material and the backing material or protective material is achieved. The increased temperature may in this case be maintained throughout the method step for the compression molding, or be varied abruptly in the manner of a temperature pulse. On account of the way in which the workpiece is permanently mold-bound, there is less risk of distortion of the workpiece even in the event of abrupt temperature changes.

Advantageously, after or during the method step for the compression molding, a pulsed cooling of the first cavity plate and/or the compression plunger is performed. It is also conceivable that the first cavity plate and/or the compression plunger is heated before or during the method step for the compression molding.

According to another embodiment of the invention, the method steps for the compression molding and the overmolding are performed over a time period T1 and the method step for the back-molding is performed over a time period T2, the time period T1 being longer than the time period T2. The extended time period T1 allows the method steps for the compression molding and the overmolding to be carried out in a slow way. Since the method step for the compression molding proceeds over an extended time period T1, dimensionally accurate and durable shaping can be achieved. Furthermore, a slow forming process allows the stressing of the material to be reduced in comparison with a fast process. In a similar way, carrying out the overmolding process slowly is conducive to the forming of a layer of protective material with a high surface quality. Consequently, an extended time period T1 contributes to increased dimensional accuracy and stability of the molded trim parts, and to an increased visual quality, in particular on the visible side of the molded trim part. According to the invention, the slow method steps in this case proceed in parallel. Between every two slow method steps, the method step for the back-molding of a compression-molded workpiece takes place over the relatively short time period T2. This contributes to increasing the efficiency of the method.

Further, it is provided that the workpiece is dried during the method step for the compression molding. This is particularly advantageous whenever the decorative blank has been moistened, for example with water or a solvent, to increase the deformability and to improve the deforming quality.

It is also advantageous if, before the method step for the compression molding, the workpiece is colored, bleached or treated for protection from light. Such processing processes are generally necessary or advantageous in the production of molded trim parts.

The object of the invention is also achieved by a device which has a compression plunger and a first cavity plate, and also an injection plunger and a second cavity plate. In this case, the cavity plates can be moved in relation to the plungers in such a way that the device can be moved into an open position and into a closed position, and that the device can also be moved into a compression position, in which the first cavity plate is assigned to the compression plunger and the second cavity plate is assigned to the injection plunger, and into a molding position, in which the first cavity plate is assigned to the injection plunger. In this case, the cavity plates and the plungers are arranged in such a way that, given the compression position and the open position, a decorative workpiece can be introduced between the compression plunger and the first cavity plate. Furthermore, the compression plunger and the first cavity plate are made to match each other in such a way that, given the compression position and the closed position, a compression mold is provided in such a way that a decorative workpiece can be compression molded and can be mold-bound in the first cavity plate. Furthermore, the first cavity plate and the injection plunger are made to match each other in such a way that, given the molding position and the closed position, a back-molding mold for back-molding the decorative workpiece with a backing material is formed. The second cavity plate and the injection plunger are finally made to match each other in such a way that, given the compression position and the closed position, an overmolding mold for overmolding the decorative workpiece with a protective material is formed.

Since two plungers and two cavity plates are provided, with the device according to the invention on the one hand it is possible by moving into the closed position and into the compression position for a compression mold to be provided for a decorative workpiece and at the same time an overmolding mold to be provided for a further decorative workpiece. On the other hand it is possible by moving into the closed position and the molding position for a back-molding mold to be provided. In this case, a possibly completed molded trim part can at the same time be removed from the second cavity plate. The device according to the invention is therefore designed specifically for carrying out the method according to the invention with the advantages described further above.

In this case if the compression plunger and the first cavity plate are formed in such a way that, in the compression position, when moving from the open position into the closed position those portions of an introduced decorative workpiece that protrude beyond the compression mold are pinched off. As already explained above with respect to the method, the pinching off of the protruding portions acts in a manner conducive to the decorative workpiece being mold-bound in the first cavity plate during the compression molding.

Further, it is provided that the compression plunger is made to match the first cavity plate in such a way that, given the compression position and closed position, an introduced decorative workpiece is pressed so as to lie against the first cavity plate, and the injection plunger is formed in such a way that, in the molding position and closed position, a mold cavity that provides the back-molding mold is formed between the first cavity plate and the injection plunger. Since the back-molding mold comprises the injection plunger, the effect that the workpiece is mold-bound to the injection plunger after the back-molding operation by the curing backing material itself can be achieved. This is advantageous for carrying out the method according to the invention, because the workpiece is mold-bound to the injection plunger.

Additionally, the injection plunger has a first injection channel for injecting the backing material and the second cavity plate has a second injection channel for injecting the protective material. The device consequently has two separate delivery systems for the two injection-molding materials (backing material and protective material). This prevents the materials from mixing, which may lead to undesired chemical reactions and consequently losses of quality. Furthermore, instances of soiling and/or encrustation often occur in the region of the injection channels, which may necessitate servicing and cleaning work. This work is made considerably easier by the described separate configuration of the injection-molding systems. The separate formation of the two injection systems also makes it possible to provide the injection-molding materials for the back-molding and overmolding at different temperatures.

Moreover, the first cavity plate has a rounded pinching edge and the compression plunger has an opposing edge, given the compression position and the closed position the opposing edge being at a distance from the pinching edge that is defined as a pinching amount. This can achieve the effect that, in the case of the pinching off described above of the portions of a decorative workpiece that protrude beyond the compression mold, they are not detached by cutting. In particular, no edge penetrates into the material to detach it. As already explained above, this has the effect of a smooth transition between the decorative workpiece and the injection-molding materials, and the decorative workpiece is mold-bound along its periphery in the first cavity plate by the pinching off.

According to the invention, a heating device is preferably provided for the compression plunger. Heating of the compression plunger is advantageous in order to make nondestructive and durable molding of the decorative workpiece possible in the compression mold. Furthermore, a possibly moistened decorative workpiece can be dried by an increased temperature. Since the device according to the invention has two plungers and two cavity plates, the different plungers and cavity plates can be respectively kept at different temperatures.

It is conceivable that a pulsed cooling device is provided for the first cavity plate and/or the compression plunger and/or the injection plunger. This allows temperature transitions between different method steps to be speeded up, which increases the cost-effectiveness of the method.

The compression plunger and the injection plunger are advantageously arranged on a common frame, and the first cavity plate and the second cavity plate are arranged on a common carrier. In this case, the carrier can be made to move in relation to the frame in such a way that the device can be moved between the open position and the closed position and/or between a compression position and a molding position. In particular, the carrier can be made to move in relation to the frame along one axis for moving the device between the open position and the closed position, and along a further axis for moving the device between the compression position and the molding position.

BRIEF DESCRIPTION OF THE DRAWINGS

Further details and advantages of the invention can be taken from the following description, on the basis of which the embodiment of the invention that is represented in the figures is described and explained in more detail.

FIG. 1 shows the device in the open position and compression position and receiving a first workpiece;

FIG. 2 shows the device from FIG. 1 during opening from the closed position after compression-molding the first workpiece;

FIG. 3 shows the device in the open position and molding position and the first workpiece being mold-bound in the first cavity plate;

FIG. 4 shows the device in the closed position and molding position and back-molding of the first workpiece;

FIG. 5 shows the device in the open position and compression position such that workpiece is mold-bound to the injection plunger and a second workpiece is placed therein;

FIG. 6 shows the device in the closed position and compression position and overmolding of the first workpiece and compression molding of the second workpiece;

FIG. 7 shows the device in the open position and compression position and the second workpiece being mold-bound in the first cavity plate.

DETAILED DESCRIPTION OF THE DRAWINGS

For better overall clarity, parts that correspond to one another are identified by the same designations in FIGS. 1 to 7.

Figure 1:
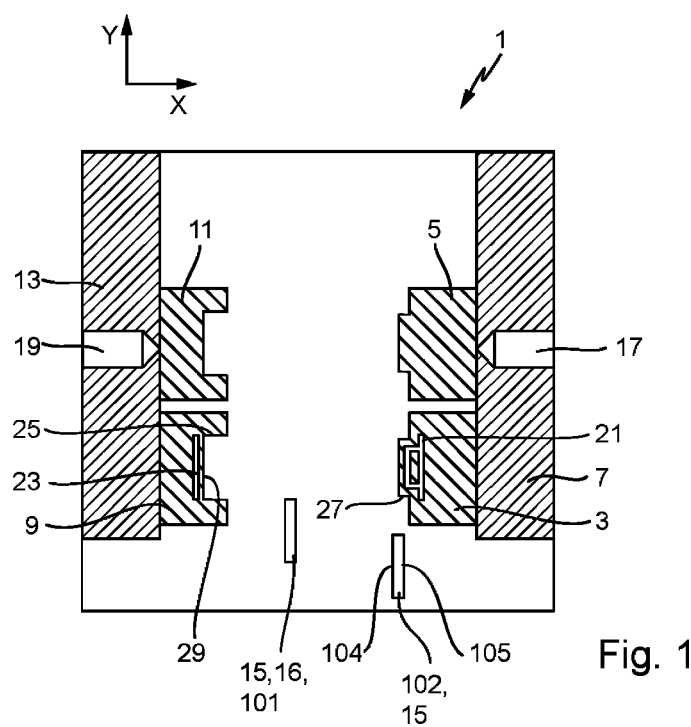
In FIGS. 1 to 7, a schematic representation of a device according to the invention is shown, the various steps of the method according to the invention are represented by way of example in the sequence of FIGS. 1 to 7. To be specific.

The device 1 according to the invention that is shown in FIG. 1 has a compression plunger 3 and an injection plunger 5, which are arranged immovably on a common frame 7. The device 1 also has a first cavity plate 9 and a second cavity plate 11, which are arranged next to each other on a carrier 13. The carrier 13 is moved in relation to the frame 7 along an axis X and axis Y. When there is movement of the carrier 13 with respect to the frame 7, both cavity plates 9, 11 are accordingly moved in parallel in relation to the plungers 3, 5.

In FIG. 1, the carrier 13 is kept at a distance from the frame 7 along the axis X in such a way that a decorative blank 16 is introduced as a decorative workpiece 15 between the plungers 3, 5 and the cavity plates 9, 11—the device is consequently in the open position. Furthermore, the position of the carrier 13 along the Y axis has been chosen such that the first cavity plate 9 lies opposite the compression plunger 3 along the X axis and is assigned to it—device 1 is in the compression position.

With regard to the method described further below, two decorative workpieces 15 are respectively represented in FIGS. 1 to 7—to be specific a first workpiece 101 and a second workpiece 102. Each of the decorative workpieces 15 has a visible side 104 of high visual quality and a backing side 105.

The injection plunger 5 has a schematically represented injection channel 17 for injecting a backing material. Serving here as the backing material is synthetic resin, which is provided in liquid form by a polymer melt system that is not represented.

In a similar way, the second cavity plate 11 provides an injection channel 19 for injecting a protective material (here: polyurethane), which is fed from a further polymer melt system that is not represented.

The compression plunger 3 has a heating device 21, by means of which the temperature of the compression plunger 3 is heated to about 130° C. For the first cavity plate 9, provided opposite it is a pulsed cooling device 23, with which the temperature can, if required, be reduced in a short time from above 100° C. to 80° C.

The first cavity plate 9 comprises a hollow profile portion 29, by means of which the desired three-dimensional final form of the molding trim part to be produced is substantially predetermined for the decorative workpiece 15. The hollow profile portion 29 is delimited by a pinching edge 25, which is rounded off. The compression plunger 3 is correspondingly made to match the hollow profile portion 29 and has, assigned to the pinching edge 25, an opposing edge 27.

Figure 2:
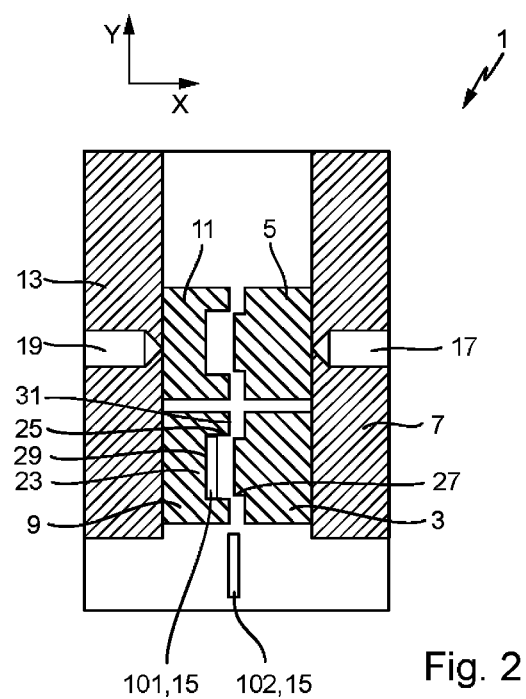

Starting from the position shown in FIG. 1 (compression position and open position), in FIG. 2 the carrier 13 has been moved in relation to the frame 7 along the X axis in such a way that the compression plunger 3 engages in the hollow profile portion 29 of the first cavity plate 9. The device 1 is then in the closed position and in the compression position. For better overall clarity, in FIG. 2 the carrier 13 has been made to move a little way back along the X axis in the direction of the open position.

Given the closed position and compression position, the compression plunger 3 and the first cavity plate 9 form a compression mold 31, in which a decorative workpiece 15 is compression-molded and can thereby be mold-bound in the first cavity plate 9.

Figure 6:
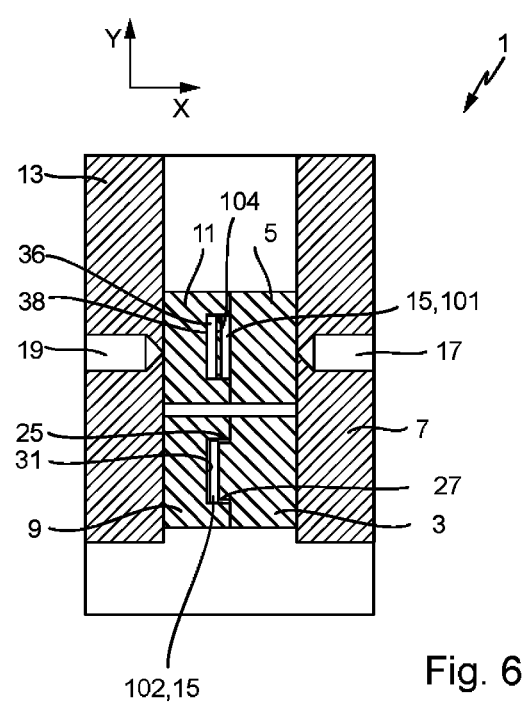

It can also be seen in FIG. 2 that, given the compression position and closed position, a gap is created between the opposing edge 27 on the compression plunger 3 and the pinching edge 25 on the first cavity plate 9. However, this gap is chosen to be narrow enough that, by moving the device 1 from the position shown in FIG. 1 into the closed position, portions of the decorative workpiece 15 that protrude beyond the compression mold 31 are pinched off. Consequently, the decorative workpiece 15 is specifically not cut to size, for example by means of two alignments of the edges. Similarly, no vertical flash face that penetrates into the decorative material for detaching the protruding portions is provided. The width of the gap created between the opposing edge 27 and the pinching edge 25 when the compression mold 31 is provided is referred to as the pinching amount. A further representation of the device 1 in the closed position and compression position is shown in FIG. 6, which is described further below and where the gap between the opposing edge 27 and the pinching edge 25 and the pinching amount is clearly seen.

Figure 3:
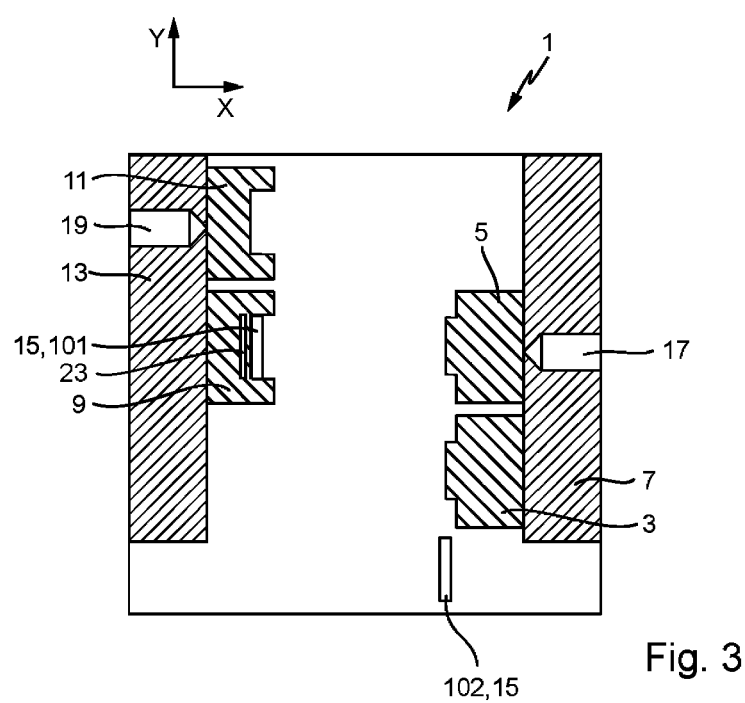

In FIG. 3, the device 1 is shown once again in the open position. In addition, the carrier 13 has been made to move upward along the Y axis in such a way that the first cavity plate now lies opposite the injection plunger 5 along the X axis and is assigned to it—the device 1 is in the molding position (and open position). It can also be seen that a decorative workpiece 1 is mold-bound as the first workpiece 101 in the first cavity plate 9.

Figure 4:
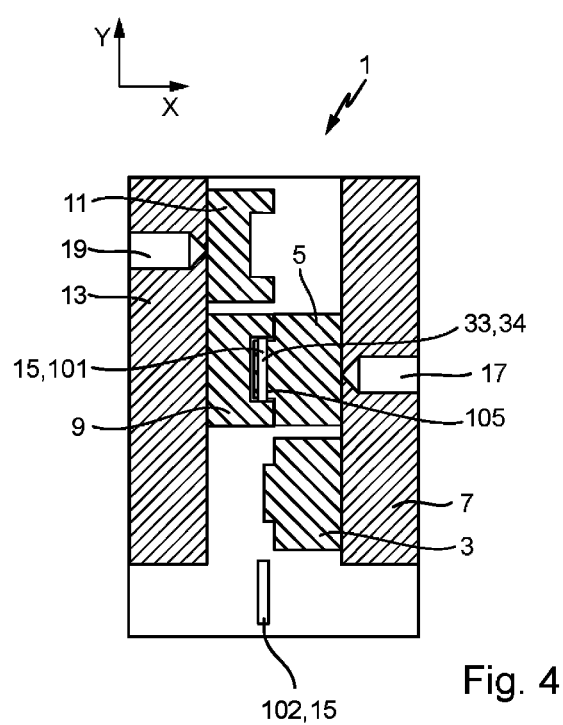

FIG. 4 shows the device 1 in the molding position, the carrier 13 having been moved from where it was in FIG. 3 along the X axis toward the frame 7 in such a way that the closed position is given. In the first cavity plate 9, a mold-bound decorative workpiece 15 is shown as the first workpiece 101.

The injection plunger 5 then assigned to the second cavity plate 9 is formed in such a way that, in the closed position and molding position represented, a mold cavity 33 is formed between the first cavity plate 9 and the injection plunger 5. In this case, a back-molding mold 34 is formed between the injection plunger 5 and the backing side 105 of the mold-bound first workpiece 101. Synthetic resin is injected as backing material into the back-molding mold 34 through the injection channel 17, which will be described in detail below.

In FIG. 5, the device 1 is again in the open position and compression position (compare FIG. 1). The first workpiece 101 is mold-bound on the injection plunger 5. The first cavity plate 9 is free again.

FIG. 6 shows the device 1 in the closed position and compression position (compare FIG. 2). The compression mold 31 is once again provided between the compression plunger 3 and the first cavity plate 9. It is clearly seen here that the opposing edge 27 of the compression plunger 3 is kept at a distance from the pinching edge 25 of the first cavity plate 9 by a pinching amount (as already explained above in relation to FIG. 2). In the compression mold 31, the second workpiece 102 is now represented in the compression-molded form.

In a way similar to the first cavity plate 9, the second cavity plate 11 has a hollow profile portion 38. This is made to match the injection plunger 5 and/or formed in a way corresponding to the compression mold 31 such that an overmolding mold 36 is provided between the visible side 104 of the first workpiece 101, which is mold-bound on the injection plunger 5, and the second cavity plate 11. For overmolding, the overmolding mold 36 is filled with the protective material via the injection channel 19.

Figure 5:
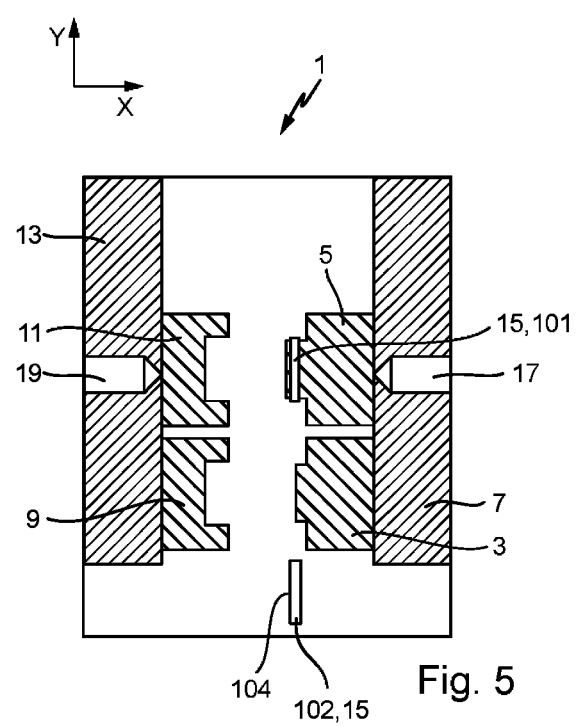
Figure 7:
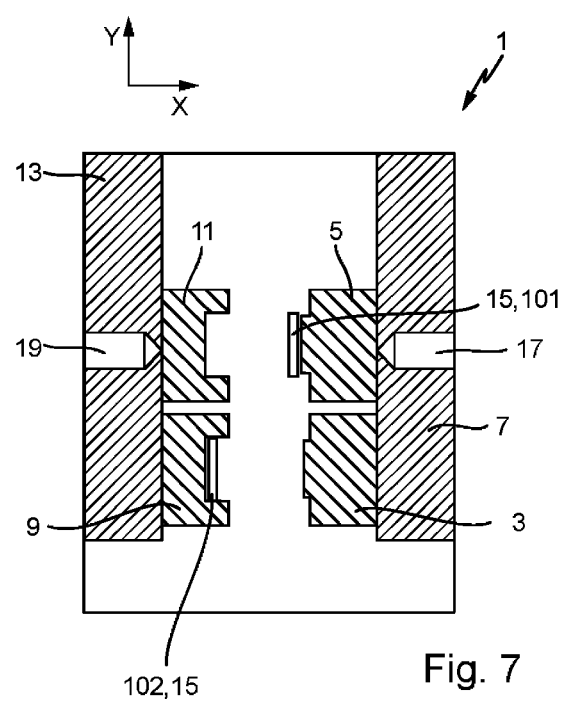

Finally, FIG. 7 shows the device 1 in the open position and compression position (compare FIGS. 1 and 5). The second workpiece 102, which is mold-bound in the first cavity plate 9, is seen. Also represented is the first workpiece 101, which is removed from the device 1 as a finished molded trim part.

With reference to FIGS. 1 to 7, the method according to the invention is explained below by way of example.

The device 1 is initially in the open position and compression position, as represented in FIG. 1. In this situation, a decorative blank 15 is introduced as a first workpiece 101 into the device 1 in such a way that the visible side 104 of the first workpiece 101 is facing the first cavity plate 9.

Subsequently, the device 1 is moved from the position represented in FIG. 1 into the closed position (while retaining the compression position). In a refinement of the method given by way of example, the compression plunger 3 is thereby heated up to about 130° C. by means of the heating device 21. When it is moved into the closed position, the compression plunger 3 engages in the hollow profile portion 29 of the first cavity plate 9. As a result, the first workpiece 101 is pressed against the first cavity plate 9 in such a way that the visible side 104 of the first workpiece 101 comes to lie against the first cavity plate 9. Should portions of the first workpiece 101 in this case protrude beyond the compression mold 31, the pinching edge 25 pinches the transitional region of the decorative material with respect to these portions against the opposing edge 27 in such a way that these portions are pinched off when the visible side 104 lies against the first cavity plate 5. As a result, the first workpiece 101 is compression-molded and mold-bound in the first cavity plate 9.

It is conducive to the compression molding that the compression plunger 3 is heated by means of the heating device 21. The increased temperature also has the effect that the first workpiece 101 is dried during the method step for the compression molding.

The method step for the compression molding is performed over a time period T1, which typically lies in the range of 10 seconds.

After the time period T1, the carrier 13 is moved back along the X axis in the direction of the open position. FIG. 2 shows a snapshot shortly after the end of the method step for the compression molding.

Following that, the device 1 is moved into the molding position, as represented in FIG. 3. The first workpiece 101 in this case remains mold-bound in the first cavity plate 9. During this method step, the first cavity mold 9 is cooled down to about 90° C. by means of the pulsed cooling device 23. This temperature value makes optimum material bonding possible during the subsequent back-molding operation.

As represented in FIG. 4, after reaching the molding position, the device 1 is moved from the open position into the closed position. As a result, the back-molding mold 34 is formed between the backing side 105 of the first workpiece 101 and the injection plunger 5. Over a time period T2, the carrier material is then injected into the back-molding mold 34 through the injection channel 17. This method step for the back-molding is performed relatively quickly over a short time period T2 that is less than T1 (T2 in the range of a few seconds). The backing material is thereby provided at a temperature of about 90° C. Since the first cavity plate 9 was cooled down with the pulsed cooling device 23 (compare FIGS. 1 and 3) to about 90° C. before the back-molding, an optimum bonding of the materials is ensured.

The curing of the backing material in the back-molding mold 34 has the effect that the first workpiece 101 is mold-bound to the injection plunger 5 along the backing side 105. When the device 1 moves once again into the open position, the first workpiece 101 consequently remains on the injection plunger 5 and the first cavity plate 9 becomes free again.

After that, as represented in FIG. 5, the device 1 is moved into the open position and back into the compression position. As explained above, the first workpiece 101 in this case remains mold-bound on the injection plunger 5. A decorative workpiece 15 is introduced once again as a second workpiece 102 into the device 1 in such a way that the visible side 104 is facing the first cavity plate 9.

After that, the device 1 is moved into the closed position, as represented in FIG. 6. The first workpiece 101, mold-bound on the injection plunger 5, is thereby introduced into the hollow profile section 38 of the second cavity plate 11, whereby the overmolding mold 36 is created between the visible side 104 of the first workpiece 101 and the second cavity plate 11. The overmolding mold 36 is fed the protective material for overmolding the decorative workpiece 15 via the injection channel 19.

As described above for the first workpiece 101, at the same time the second workpiece 101 is compression-molded and mold-bound in the first cavity plate 9. Once again, as explained above, the protruding portions are thereby pinched off.

The method steps for the compression molding and bounding to the mold of the second workpiece 102 and for the overmolding of the first workpiece 101 in this case proceed in parallel over the time period T1.

With respect to FIG. 7, the device is moved again into the open position. In a way corresponding to the first workpiece 101 in FIGS. 2 and 3, the second workpiece 102 is mold-bound in the first cavity plate 9. The first workpiece 101 is then a finished molded trim part, which has a three-dimensional form predetermined substantially by the compression mold 31, back-molded with backing material for stabilization and mounting and coated with a protective material on the visible side 105. In the situation shown in FIG. 7, the finished molded trim part is removed from the device 1 and the method is continued.

The invention claimed is:

1. A method for producing molded trim parts, wherein the following steps are carried out in succession, the method comprising:
   i) compression molding of a decorative blank, having a visible side and a backing side, as a first workpiece in a compression mold, which comprises a compression plunger and a first cavity plate, in such a way that, after the compression molding, the first workpiece is mold-bound in the first cavity plate;
   ii) back-molding of the first workpiece with a backing material on the backing side in a back-molding mold, which includes the first cavity plate and an injection plunger, the first workpiece remaining mold-bound on the injection plunger after the back-molding;
   iii) overmolding of the first workpiece with a protective material on the visible side in an overmolding mold, which comprises the injection plunger and a second cavity plate, wherein, a further decorative blank as a second workpiece is compression-molded and mold-bound in the first cavity plate in a way corresponding to method step (i).

2. A method for producing molded trim parts in a device, which has a compression plunger and a first cavity plate, for pre-defining a compression mold, and also an injection plunger and a second cavity plate, wherein the cavity plates are moved in relation to the plungers in such a way that the device is moved from an open position to a closed position and a compression position, in which the first cavity plate is assigned to the compression plunger and the second cavity plate is assigned to the injection plunger, and into a molding position, in which the first cavity plate is assigned to the injection plunger, the method further including:
   a) introducing a decorative blank, having a visible side and a backing side, as a first workpiece into the device in the open position and compression position in such a way that the visible side is facing the first cavity plate;
   b) moving the device into the closed position for compression molding the first workpiece between the compression plunger and the first cavity plate in such a way that the visible side lies against the first cavity plate;
   c) moving the device into the open position and into the molding position, the first workpiece being mold-bound in the first cavity plate;
   d) moving the device into the closed position for back-molding the first workpiece with a backing material on the backing side in a back-molding mold, which is provided substantially by the injection plunger and the first cavity plate;
   e) moving the device into the open position and back into the compression position, the first workpiece remaining mold-bound on the injection plunger;
   f) introducing a second decorative blank as a second workpiece in a way corresponding to method step a) for the first workpiece;
   g) moving the device into the closed position for overmolding the first workpiece with a protective material on the visible side in an overmolding mold, which is provided substantially by the injection plunger and the second cavity plate in the closed position, wherein, in the same method step, compression molding of the second workpiece is performed in the first cavity plate in a way corresponding to method step b) for the first workpiece and after that the rest of the method is carried out for the second workpiece as it was for the first workpiece.

3. The method of claim 1, wherein compression molding includes pinching off those portions of the first workpiece that protrude beyond the compression mold.

4. The method of claim 1, wherein a bonding layer of a binding material is applied to the backing side before the back-molding and/or to the visible side before the overmolding.

5. The method of claim 1, wherein an increased temperature is provided in the method step for the compression molding in comparison with the method step for the back-molding and/or the overmolding.

6. The method of claim 1, wherein after or during the method step for the compression molding, a pulsed cooling of the first cavity plate and/or the compression plunger is performed.

7. The method of claim 1, wherein compression molding and overmolding are performed over a time period T1 and the method step for the back-molding is performed over a time period T2, the time period T1 being longer than the time period T2.

8. The method of claim 1, wherein the workpiece is dried during the method step for the compression molding.

9. The method of claim 1, wherein before the method step for the compression molding, the workpiece is colored, bleached or treated for protection from light.

* * * * *